(12) United States Patent
Couasnon

(10) Patent No.: US 8,469,432 B2
(45) Date of Patent: Jun. 25, 2013

(54) SLIDING RAIL FOR VEHICLE SEAT AND VEHICLE SEAT COMPRISING SUCH A RAIL

(75) Inventor: Christian Couasnon, Flers (FR)

(73) Assignee: Faurecia Sièges d'Automobile, Nanterre (FR)

( * ) Notice: Subject to any disclaimer, the term of this patent is extended or adjusted under 35 U.S.C. 154(b) by 155 days.

(21) Appl. No.: 13/106,435

(22) Filed: May 12, 2011

(65) Prior Publication Data

US 2011/0278875 A1 Nov. 17, 2011

(51) Int. Cl.
*B60N 2/06* (2006.01)
*B60N 2/07* (2006.01)

(52) U.S. Cl.
USPC ............... 296/65.13; 296/65.15; 297/344.1; 248/503.1

(58) Field of Classification Search
USPC .............. 296/65.13, 65.14, 65.15; 297/344.1; 248/429, 503.1
See application file for complete search history.

(56) References Cited

U.S. PATENT DOCUMENTS

| 5,393,028 | A | 2/1995 | Satoh et al. | |
|---|---|---|---|---|
| 7,407,214 | B2 * | 8/2008 | Long | 296/65.13 |
| 7,484,787 | B2 * | 2/2009 | Hofschulte et al. | 296/65.15 |
| 7,669,824 | B2 * | 3/2010 | Woehrle et al. | 248/429 |
| 2006/0278037 | A1 | 12/2006 | Borbe et al. | |
| 2007/0152485 | A1 * | 7/2007 | Ehrhardt | 297/344.1 |
| 2009/0000424 | A1 | 1/2009 | Taubmann et al. | |
| 2010/0133408 | A1 * | 6/2010 | Umezaki et al. | 248/429 |

FOREIGN PATENT DOCUMENTS

| FR | 2882974 A1 * | 9/2006 |
|---|---|---|
| FR | 2921022 A1 | 3/2009 |

OTHER PUBLICATIONS

Search report from counterpart French Application No. FR 0706459; Report dated Mar. 27, 2008.

* cited by examiner

*Primary Examiner* — Glenn Dayoan
*Assistant Examiner* — Jason S Daniels
(74) *Attorney, Agent, or Firm* — Miller, Matthias & Hull LLP

(57) ABSTRACT

A sliding rail for a vehicle seat, comprising a fixed section and a mobile section assembled to slide on the fixed section and controlled by a screw-nut system comprising a longitudinal adjusting screw. The adjusting screw is integral with a support which comprises a base pressing against the bottom of the fixed section. The base and the bottom of the fixed section are traversed by an attaching screw screwed into the floor of the vehicle. The base of the support is held against the bottom of the fixed section by a retaining tab which passes above the base and which is integral with the bottom.

9 Claims, 5 Drawing Sheets

SLIDING RAIL FOR VEHICLE SEAT AND VEHICLE SEAT COMPRISING SUCH A RAIL

CROSS-REFERENCE TO RELATED APPLICATIONS

This application claims priority under the Paris Convention to the French Patent Application No. 10 53801, filed on May 17, 2010.

FIELD OF THE DISCLOSURE

This invention relates to sliding rails for vehicle seats and to the vehicle seats comprising such rails.

It more particularly relates to a sliding rail for a vehicle seat comprising a fixed section adapted to be integral with the floor of the vehicle and a mobile section sliding on the fixed section in a longitudinal direction and intended to support the seat part of the vehicle seat. Said sliding rail comprises a control mechanism comprising an adjusting screw extending in the longitudinal direction, the fixed section having at least one bottom of a width extending transversely between two lateral wings, the adjusting screw being integral with a support which comprises a base pressing against the inner face of the bottom of the fixed section, said base and the bottom of the fixed section respectively comprising mutually corresponding mounting holes to allow the passage of an attaching screw for attaching to the floor of the vehicle.

BACKGROUND OF THE DISCLOSURE

There are known sliding rails of this type, in which the base of the support is attached to the bottom of the fixed section by a rivet placed between one end of the adjusting screw and the recess in said base.

This arrangement has several disadvantages:
the rivet represents an additional cost,
for a given position of the recess in the bottom of the sliding rail (position which is generally dictated by the vehicle manufacturer), the length of the adjusting screw is limited by the presence of the rivet, and therefore the range of possible sliding rail travel is also limited.

SUMMARY OF THE DISCLOSURE

An aim of the invention is to overcome these disadvantages.

In the invention, a sliding rail of this type has the base of the support held against the bottom of the fixed section by at least one retaining bracket which passes above said base and which is integral with said bottom (the retaining bracket and the bottom can be formed from a single piece, through forming of a tab or the retaining bracket can be attached to the bottom).

This avoids the use of a rivet for attaching the support to the bottom of the fixed section of the sliding rail, which simplifies the sliding rail and its manufacturing process, limits the cost of the sliding rail, and allows extending the travel distance of the sliding rail.

In preferred embodiments of the sliding rail of the invention, one and/or more of the following arrangements may be used:
the retaining bracket extends transversely between its two fixed ends which are integral with the bottom;
said retaining bracket has two transverse lateral portions, each extending from one of the fixed ends and each offset relative to the other, connected to each other by a central connecting segment extending at least partially in the longitudinal direction;
said retaining bracket has two transverse lateral portions, each extending from one of the fixed ends, and a transverse central portion connected to said transverse lateral portions by two respective narrowed segments;
the retaining bracket extends transversely between a fixed end that is integral with the bottom of the fixed section and a free end;
the retaining bracket and the bottom of the fixed section are formed from a single piece, and the retaining bracket is defined by a cutout in the bottom of the fixed section;
the retaining bracket is formed as a single piece with a brace pressing against the bottom of the fixed section, opposite said inner face, and said retaining bracket passes through a cutout in the bottom of the fixed section, while said brace comprises a mounting hole in correspondence with the respective mounting holes of the bottom of the fixed section and of the base of the support, to allow the passage of said attaching screw for attachment to the floor of the vehicle;
the sliding rail additionally comprises at least said attaching screw for attachment to the floor of the vehicle, with this attaching screw passing through the respective mounting holes of the bottom of the fixed section and of the base of the support;
the retaining bracket is in the form of a sheet of metal substantially parallel to the bottom of the fixed section;
the retaining bracket is in the form of a sheet of metal substantially perpendicular to the longitudinal direction;
the retaining bracket has a projecting portion which has localized contact with the base of the support;
the retaining bracket has a projecting portion which has linear contact with the base of the support;
the base of the support comprises a main body and a pointed end directed towards the retaining bracket, said base having a flat lower side pressing against the inner face of the bottom of the fixed section and an upper side which is parallel to the lower side at the main body of the base and which, at the pointed end, extends at an angle towards the bottom and away from the main body.

During the attachment of the support of the adjusting screw to the bottom of the fixed section, the base of the support can simply be slid under the retaining bracket while pressing against said retaining bracket, or the retaining bracket can be crimped onto the base to apply elastic pressure by said bracket on said base.

Another object of the invention is a vehicle seat comprising at least one sliding rail as defined above, and a seat part that is integral with the mobile section of said sliding rail.

Other features and advantages of the invention will become apparent from the following description of several of its embodiments, provided as non-limiting examples, and illustrated in the accompanying drawings.

DETAILED DESCRIPTION

The same references are used to designate identical or similar elements in the figures.

Figure 1:
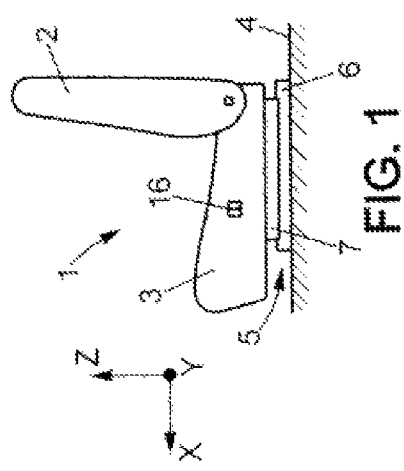
FIG. 1 is a schematic view of a seat which can include sliding rails of the invention.

FIG. 1 represents a seat 1 of an automobile, comprising a backrest 2 supported by a seat part 3 which is mounted to slide on the floor 4 of the vehicle in a longitudinal direction X that is substantially horizontal.

The seat part 3 is connected to the floor 4 by two parallel sliding rails 5, of which only one is visible in FIG. 1.

Figure 2:
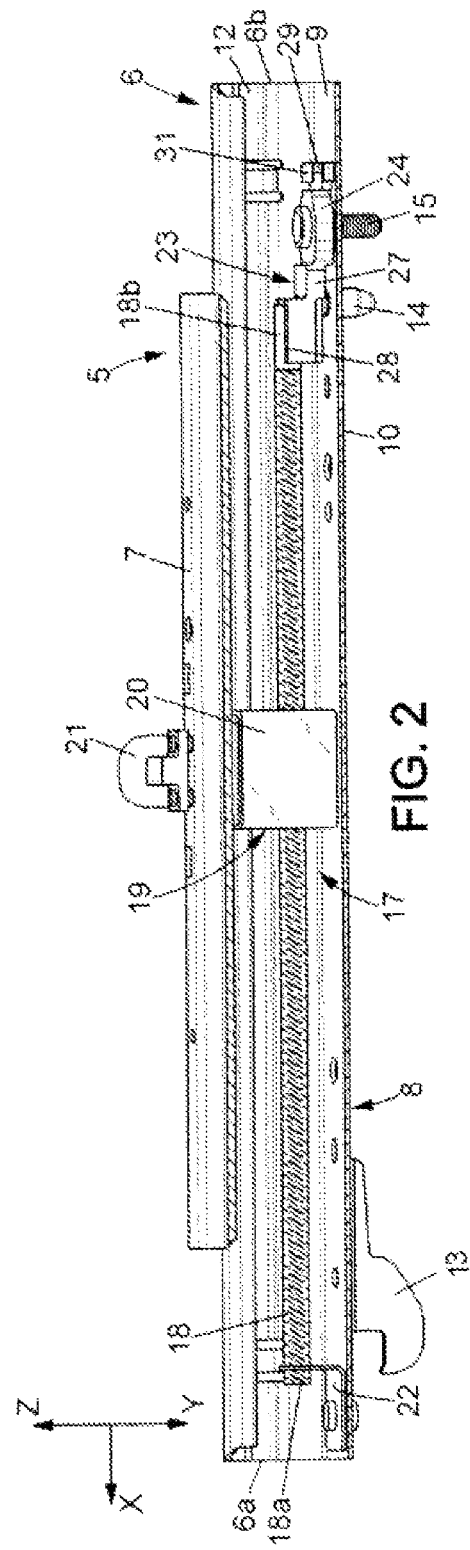
FIG. 2 is a vertical longitudinal cross-sectional view of one of the sliding rails of the seat of FIG. 1, in a first embodiment of the invention.

As represented in FIG. 2, each of the sliding rails 5 comprises first and second sliding elements 6, 7, respectively formed by a fixed metal section 6 attached to the floor 4 and a mobile metal section 7 attached to the seat part 3. These rails slide on each other in the direction X.

Figure 3:
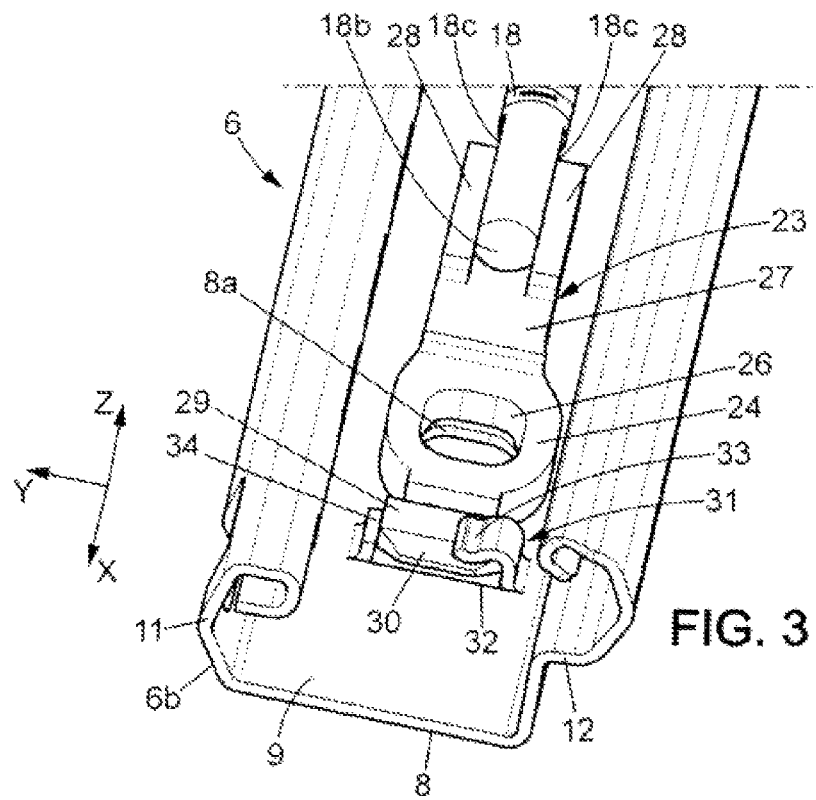
FIG. 3 is a perspective view of the back end of the fixed section of the sliding rail of FIG. 2, comprising a support which holds the adjusting screw of the sliding rail.

The fixed section 6 may for example have a substantially U-shaped cross-section, clearly visible in FIGS. 2 and 3, comprising:

a horizontal bottom 8 extending lengthwise in the direction X and extending widthwise in a transverse horizontal direction Y perpendicular to direction X, said bottom 8 having an inner face 9 (an upper face oriented towards the inside of the sliding rail), and an outer face 10 opposite the inner face 9, and two lateral wings 11, 12 on each side of the bottom 8, extending lengthwise in the direction X and extending in height in a vertical direction Z.

The bottom 8 of the fixed section can be attached to the floor of the vehicle by any known means, for example:

at the front end 6a of the fixed section, by means of a catch 13 hooking it to the floor 4, and at the back end 6b of the fixed section, by means of a pin 14 fitting into a recess in the floor 4 and a screw 15 which screws vertically into the floor 4.

The sliding rails 5 of the seats here are electrically powered, controlled for example by a button 16 (FIG. 1) placed for example on the side of the seat part of the vehicle seat.

As represented in FIG. 2, each of the sliding rails 5 can comprise a motorized adjustment device 17 controlled by means of said button 16, with each adjustment device 17 comprising, for example:

an adjusting screw 18 that is integral with the bottom 8 of the fixed section of the sliding rail, and a device 19 with a swivel nut in which the swivel nut (not represented) is screwed onto the screw 18 and is assembled to rotate around the direction X in a housing 20 which is integral with the mobile section 7 of the sliding rail. The swivel nut of the device 19 is caused to rotate by an electric motor 21 which generally is shared by both sliding rails 5 of the seat.

For more details on swivel nut devices 19 and how they are driven by an electric motor 21, refer to patent document FR-A-2 921 022.

The front end 18a of the adjusting screw 18 can be attached to the bottom 8 of the fixed section by any known means, for example by an L-shaped attaching bracket 22 into which the front end of the adjusting screw is screwed and which is riveted onto the bottom 8 of the fixed section, or which is fixed to said bottom by any other known means.

Figure 4:
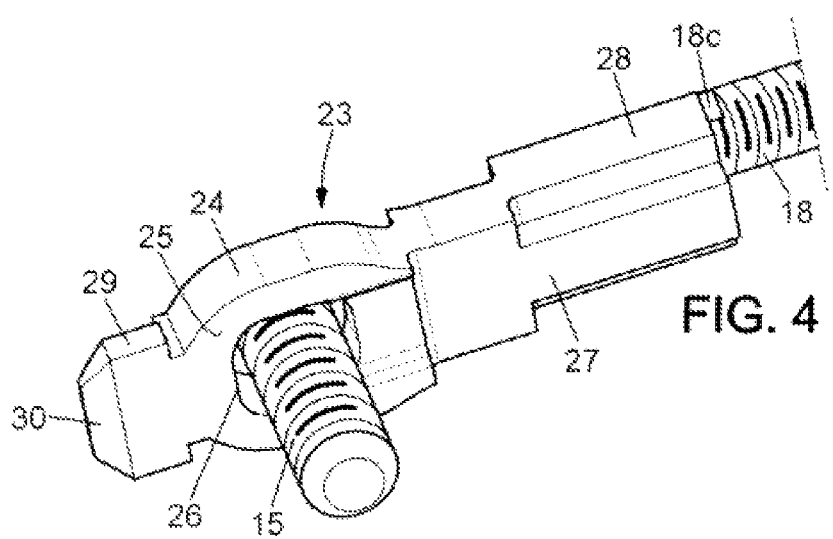
FIG. 4 is a perspective view showing the adjusting screw support of FIG. 3 in a three-quarter view from above.

The back end 18b of the adjusting screw is connected to the bottom 8 of the fixed section by means of a metal support 23 which will be described in more detail with reference to FIGS. 3 and 4.

The support 23 comprises a main body 24 which has a flat lower face 25 resting on the flat upper face 9 of the bottom 8. The main body 24 is pierced with a vertical mounting hole 26 which is arranged to correspond with a mounting hole 8a in the bottom 8, and these two holes 26 and 8a are vertically traversed by the attaching screw 15 referred to above.

The main body 24 of the support 23 extends forwards in a supporting arm 27 substantially in the plane X, Y and equipped with two lateral wings 28 each extending upwards parallel to the plane X, Z.

The back end 18b of the adjusting screw 18 additionally has two flats 18c which are also parallel to the plane X, Z. Said back end 18b fits tightly between the two lateral wings 28, such that each of the flats 18c is in contact with the inner face of one of the lateral wings 28.

The back end 18b of the adjusting screw is integrally attached in a permanent manner to the support 23, by welding the flats 18c and the lateral wings 28.

The main body 24 of the support 23 also has a rear extension in the form of a connector piece 29 having a lower face that is a prolongation of the supporting face 25 mentioned above, and an upper face that is flat and parallel to the plane X, Y. This connector piece 29 advantageously has a pointed end 30 at the back which has beveled lateral, lower, and upper faces.

The main body 24 and the connector piece 29 together form the base 24, 29 by which the support 23 presses against the bottom 8 of the fixed section.

A generally rectangular cutout 32 is made in the bottom 8, in correspondence with the connector piece 29, defining two lateral brackets:

a retaining bracket 31 extending transversely in the direction Y, having a fixed end that is integral with the bottom 8 (formed as a tab of the same material as the bottom 8) and a free end 33; the retaining bracket 31 passes above the connector piece 29 and the free end 33 of the retaining bracket elastically supported by the upper face of said connector piece 29, a relatively short stop bracket 34 which simply presses laterally against one side of the connector piece 29 (advantageously, the retaining bracket 31 can also press laterally against the opposite side of the connector piece 29).

The free end 33 of the retaining bracket 31 may advantageously be curved, to form a downward protuberance which is in substantially localized contact or in linear contact with the upper face of the connector piece 29. It will be noted that in all embodiments of the invention, the contact of the retaining bracket with the base of the support 23 can be localized or linear.

By these measures, the support 23 is easily attached in an integral manner to the fixed section 6, even before the screw 15 is in place, simply by inserting the pointed end 30 of the connector piece 29, below the retaining bracket 31. After the front end of the adjusting screw 18 is fixed in place by means of the bracket 22 or by any other means, the adjusting screw 18 is then held in position until its final attachment when the attaching screw 15 is screwed into the floor 4 of the vehicle. In addition, the lower face of the bottom 8 of the sliding rail remains completely flat, which facilitates the integration of the sliding rail with the floor of the vehicle (unlike a solution where the support 23 is riveted onto the bottom 8 of the fixed section of the sliding rail).

In the second, third, and fourth embodiments of the invention, represented in FIGS. 5 to 9, the sliding rail 5 is similar to the one described above and will not be described again here. Only the differences from the first embodiment will be detailed.

In these second, third, and fourth embodiments of the invention, the above retaining bracket 31 and stop bracket 34 are eliminated and replaced with a single retaining bracket, respectively 35, 38, 46, which forms a bridge above the connector piece 29 of the support and which extends substantially in the transverse direction Y between two ends which are integral with the bottom 8 of the fixed section. In these three embodiments, the retaining bracket 35, 38, 46 presses against the upper face of the connector piece 29, and the lateral portions of the retaining bracket may preferably serve as stops on each side of the connector piece 29.

Figure 5:
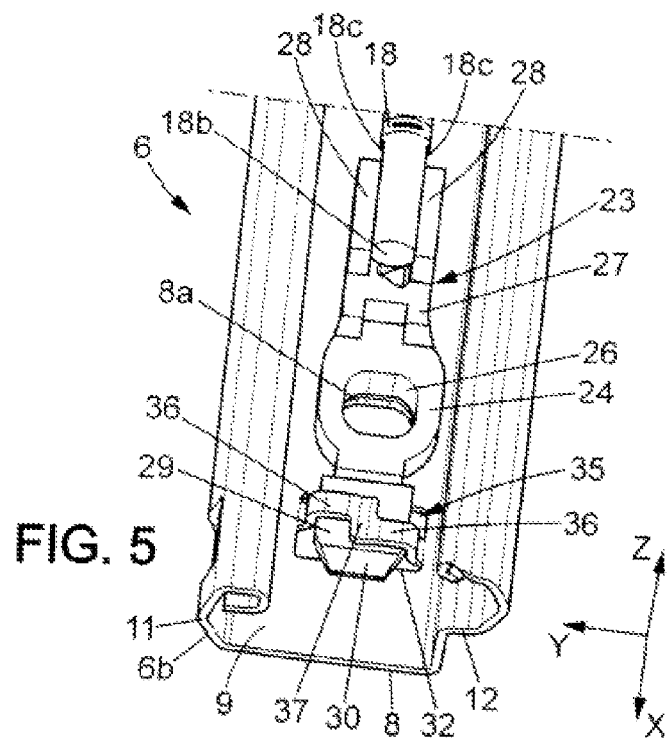
FIGS. 5 to 7 are views similar to FIG. 3, showing the back end of the fixed section of the sliding rail in second, third, and fourth embodiments of the invention.
Figure 6:
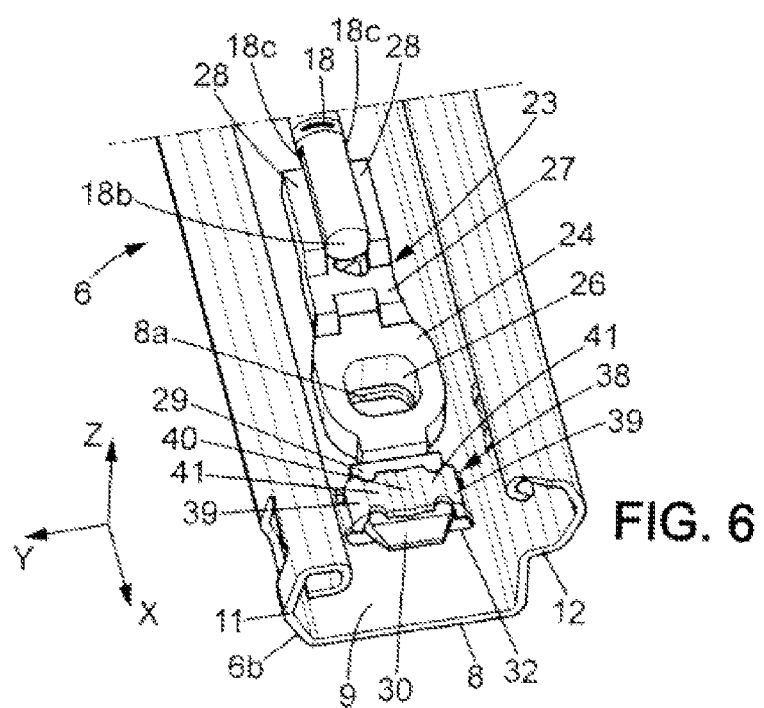

In the second and third embodiments of the invention, the retaining bracket 35, 38 is of one piece with the bottom 8 of the fixed section and is formed by cutting and stamping during the formation of the cutout 32:

in the second embodiment of the invention, represented in FIG. 5, the retaining bracket 35 has two transverse lateral portions 36 extending upwards and in the transverse direction Y from one of the fixed ends of said retaining bracket 35, said fixed end being of one piece with the bottom 8 of the fixed section at one of the lateral edges of the cutout 32, and the two transverse lateral portions are connected to each other by a connecting segment 37 extending at least partially in the longitudinal direction X (this form of the bracket 35 facilitates the cutting and stamping to create the bracket, and in particular facilitates the shaping of the bracket 35), and in the third embodiment of the invention, represented in FIG. 6, the retaining bracket 38 has two transverse lateral portions 39 each extending upwards and in the transverse direction Y from one of the fixed ends of the retaining bracket, said fixed end being of one piece with the bottom 8 at one of the lateral edges of the cutout 32, and the retaining bracket 38 additionally comprises a transverse central portion 40 which is respectively connected to said lateral portions 39 by two narrowed segments 41 (this form of the bracket 38 facilitates the cutting and stamping to create the bracket, and in particular facilitates the shaping of the bracket 38).

Figure 7:
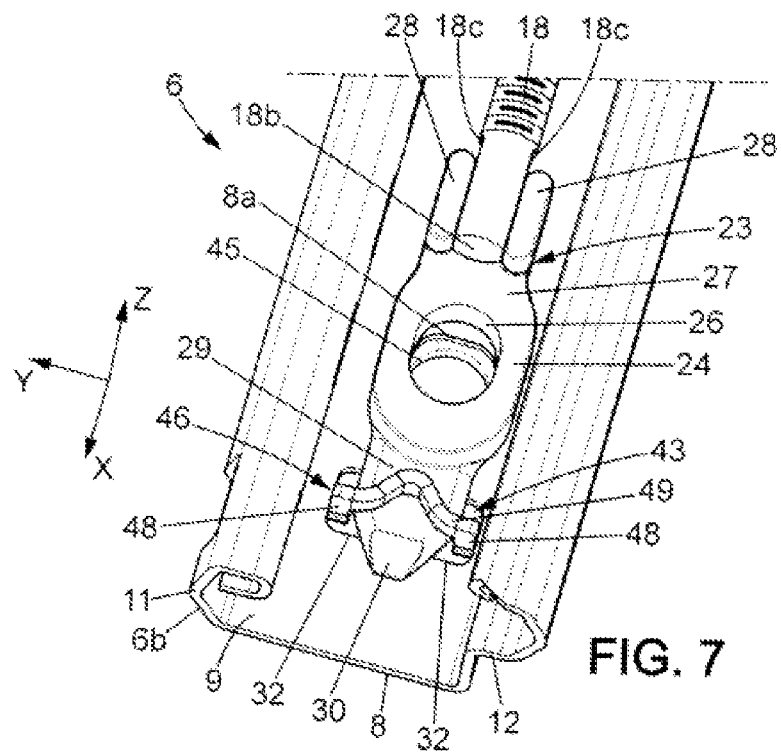
Figure 8:
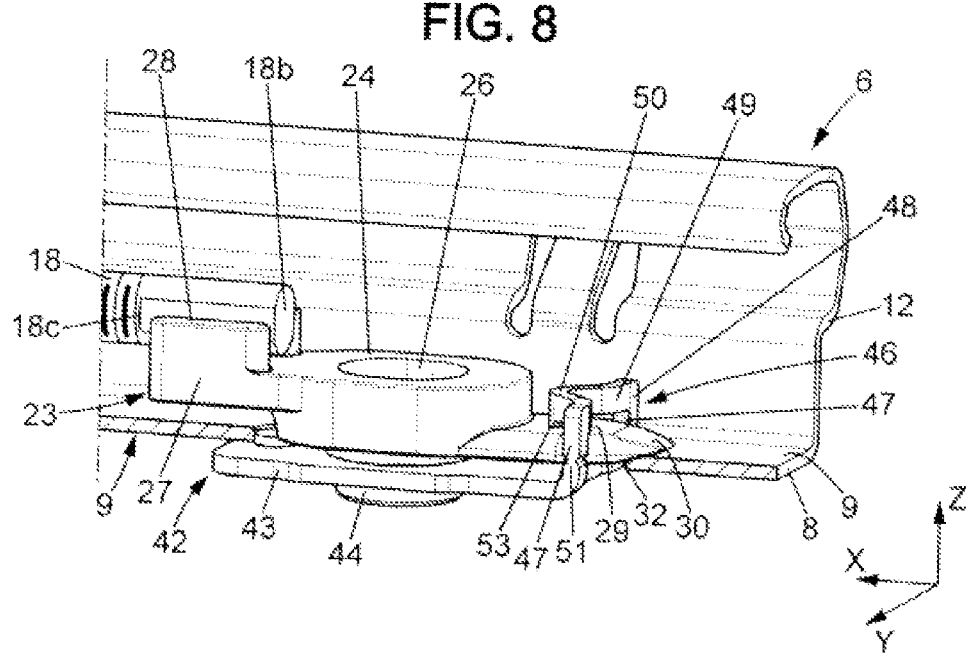
FIG. 8 is a vertical longitudinal cross-sectional view of the back end of the fixed section of FIG. 7.
Figure 9:
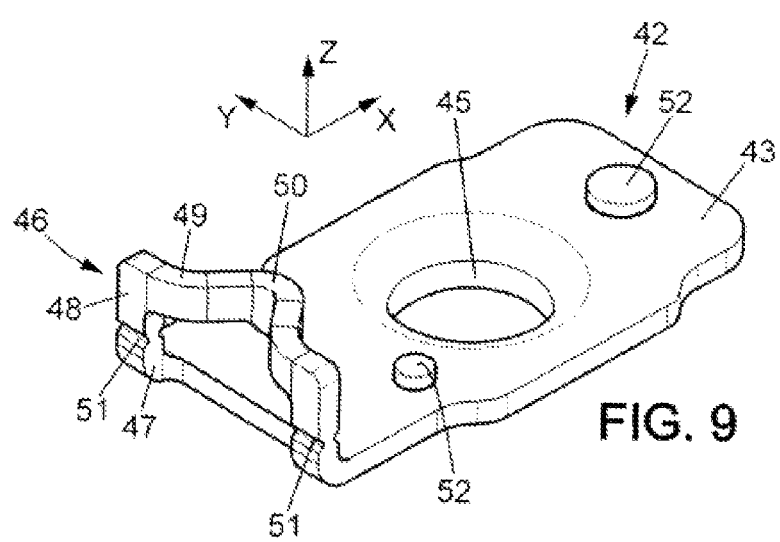
FIG. 9 is a perspective view of a brace on the back end of the fixed section of FIGS. 7 and 8.

In the fourth embodiment of the invention, represented in FIGS. 7 to 9, the retaining bracket 46 is of one piece with a metal brace 42 comprising a supporting plate 43 in contact with the outer face 9 of the bottom 8, this supporting plate 43 having, facing the abovementioned mounting holes 8a, 26, a thick portion 44 which is pierced with a mounting hole 45 that is traversed by the attaching screw 15 screwed into the floor.

The rear part of the supporting plate 43 is folded upwards, and comprises a cutout 47 which defines the retaining bracket 46 mentioned above. This retaining bracket comprises two substantially vertical lateral arms 48 which pass through the cutout 32 in the bottom 8 of the fixed section, and a bridge 49 connecting the two lateral arms 47 presses against the upper face of the connector piece 29 of the support. In this case, the retaining bracket 46 extends in a mid plane perpendicular to the direction X, while the previously described retaining brackets 31, 35, 38 extend in a mid plane parallel to the bottom 8 of the fixed section.

The lateral arms 48 of the retaining bracket 46 may, if applicable, comprise thinned areas 51 where the thickness of the sheet forming the supporting plate 43 is reduced. These thinned areas provide control when folding the rear portion of the brace.

The bridge 49 may have a wave shape 50 where the central portion bulges horizontally towards the front, and may possibly comprise a lower projecting part 53 to allow controlling the stresses from the bridge 49 pressing against the connector piece 29 (and therefore controlling the stresses when the support 23 is inserted under the retaining bracket 46).

It is also possible, as represented in FIG. 9, for the upper face of the supporting plate 43 to comprise one or more pins 52 which fit into corresponding recesses in the bottom 8 of the fixed section, to allow accurate positioning of the brace 42.

The invention claimed is:

1. A sliding rail for a vehicle seat having a seat part, comprising a fixed section adapted to be integral with a floor of the vehicle and a mobile section assembled to slide on the fixed section in a longitudinal direction and intended to support the seat part of the vehicle seat, said sliding rail also comprising a control mechanism comprising an adjusting screw extending in the longitudinal direction, with the fixed section having at least one bottom of a width extending in a transverse direction between two lateral wings, the adjusting screw being integral with a support which comprises a base pressing against the bottom of the fixed section, said base and the bottom of the fixed section respectively comprising mutually corresponding mounting holes to allow the passage of an attaching screw for attaching to the floor of the vehicle, wherein the base of the support is held against the bottom of the fixed section by at least one retaining tab which passes above said base and which is integral with said bottom.

2. A sliding rail according to claim 1, wherein the retaining tab extends in the traverse direction Y between two fixed ends which are integral with the bottom.

3. A sliding rail according to claim 2, wherein said retaining tab has two transverse latbral portions, each extending from one of the fixed ends and each offset relative to the other, said transverse lateral portions being connected to each other by a central connecting segment extending at least partially in the longitudinal direction X.

4. A sliding rail according to claim 2, wherein said retaining tab has two transverse lateral portions, each extending from one of the fixed ends, and a transverse central portion connected to said transverse lateral portions by two respective narrowed segments.

5. A sliding rail according to claim 1, wherein the retaining tab extends in the transverse direction between a fixed end that is integral with the bottom of the fixed section and a free end.

6. A sliding rail according to claim 1, wherein the retaining tab and the bottom of the fixed section are formed from a single piece, and the retaining tab is defined by a cutout in the bottom of the fixed section.

7. A sliding rail according to claim 1, wherein the retaining tab is formed as a single piece with a brace pressing against the bottom of the fixed section, and said retaining tab passes through a cutout in the bottom of the fixed section, while said brace comprises a mounting hole in correspondence with the respective mounting holes of the bottom of the fixed section and of the base of the support, to allow the passage of said attaching screw for attachment to the floor of the vehicle.

8. A sliding rail according to claim 1, additionally comprising at least one said attaching screw for attachment to the floor of the vehicle, with this attaching screw passing through the respective mounting holes of the bottom of the fixed section and of the base of the support.

9. A vehicle seat comprising:

at least one sliding rail comprising a fixed section adapted to be integral with a floor of the vehicle and a mobile section assembled to slide on the fixed section in a longitudinal direction, said sliding rail also comprising a control mechanism comprising an adjusting screw extending in the longitudinal direction, with the fixed section having at least one bottom of a width extending in a transverse direction between two lateral wings, the adjusting screw being integral with a support which comprises a base pressing against the bottom of the fixed section, said base and the bottom of the fixed section respectively comprising mutually corresponding mounting holes to allow the passage of an attaching screw for attaching to the floor of the vehicle, the base of the support being held against the bottom of the fixed section by at least one retaining tab which passes above said base and which is integral with said bottom, and a seat part that is integral with the mobile section of said sliding rail.

\* \* \* \* \*